United States Patent Office 3,338,899
Patented Aug. 29, 1967

3,338,899
3-PHENYL-5-AMINO-1,2,4-OXADIAZOLE COMPOUNDS
Jan Marcel Didier Aron-Samuel, 118 Rue Carnot, Suresnes, France, and Jean Jacques Sterne, Suresnes, France; said Sterne assignor to said Aron-Samuel
No Drawing. Filed Sept. 28, 1965, Ser. No. 491,045
12 Claims. (Cl. 260—268)

This application is a continuation-in-part of our copending application Ser. No. 208,606, filed July 9, 1962, now abandoned.

The present invention relates to certain novel compounds of the following general formula:

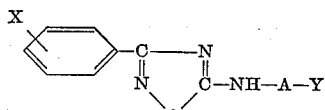

wherein X is a member of the group consisting of hydrogen and hydroxy; lower alkyl such as methyl, ethyl, propyl, isopropyl, butyl, isobutyl; or alkoxy such as methoxy, ethoxy or propoxy; and halogen such as chlorine, bromine, iodine or fluorine; A is a divalent alkylene group of the formula

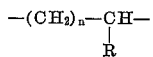

wherein $n$ is 0 to 3 and R is hydrogen or lower alkyl such as methyl or ethyl, and Y is a monovalent radical containing a nitrogen atom bound to group A and selected from the group consisting of the radical

wherein $R_1$ and $R_2$ are each a straight or branched chain lower alkyl group or alkylene group having one to six carbon atoms, and of the N-methylpiperazino and 1'-piperidyl.

The novel compounds of this invention are active pharmacodynamically on the cardiovascular system and are particularly useful as coronary vasodilators. Certain of these compounds are quite active as local anesthetics.

The compounds of this invention are obtained by reacting a 3-phenyl-5-amino-1,2,4-oxadiazole of the formula:

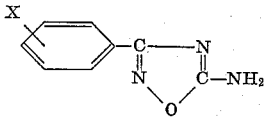

where X has the meaning above in a suitable inert and anhydrous organic solvent medium such as benzene, toluene or xylene, for example, with an alkali such as sodamide, potassium hydroxide, sodium hydroxide or potassium carbonate or with sodium hydride to convert it to an alkali metal derivative of the formula

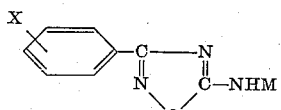

wherein M is an alkali metal, and then reacting said derivative with a dialkylaminoalkyl halide such as the chloride or bromide, for example, or a corresponding nitrogen heterocyclic substituted alkyl halide usually at reflux temperature and for up to about five or six hours. An alkali metal halide is formed as a by-product and precipitates from the reaction mixture on standing and can be filtered off. The reaction product can be separated by distilling off the reaction solvent and the product can be purified by fractional distillation, usually under vacuum, if desired.

The 3-phenyl-5-amino-1,2,4-oxadiazole intermediate utilized for preparing our novel compounds may be obtained, for example, by reacting a benzaldoxime of the formula:

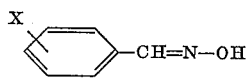

or more preferably the corresponding chloroxime in solution in benzene:

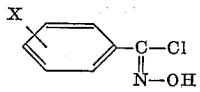

with cyanamide NH=C=NH in aqueous or organic medium to form the desired 3-phenyl-5-amino-1,2,4-oxadiazole intermediate of the formula:

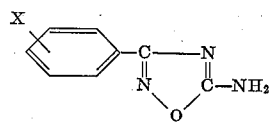

The cyanamide is introduced into a reaction vessel containing sodium ethylate in an excess of ethanol and the mixture cooled with an ice-sodium chloride bath which can reach a temperature of about −20° C. The mol equivalent amount of the chloroxime in anhydrous ethanol solution is added at low temperature and, after being held at room temperature for about twelve hours or overnight, the sodium chloride precipitate is filtered off. The ethanol solvent is evaporated off on a steam bath, the residue treated with boiling water and, on cooling, the crystalline oxadiazole is obtained melting at 154° C. This intermediate is soluble in hot alcohol, in ligroin and in water as well as in hydrochloric acid but is insoluble in dilute sodium hydroxide. More specifically, it is readily synthesized by reacting, for example, 33 grams of cyanamide with 114 grams of the above chloroxime in 100 ml. of anhydrous ethanol in a solution of sodium ethylate formed of 18 grams of metallic sodium in 200 ml. of anhydrous ethanol.

The novel compounds of our invention are bases which form acid addition salts with inorganic acids such as, for example, hydrochloric, hydrobromic, sulfuric, methanesulfonic, nitric and phosphoric acids and with organic acids such as, for example, oxalic, maleic, tartaric, citric, acetic and succinic acid. The monosalts are preferred. These nontoxic acid addition salts are all included within the scope of our invention.

In combination with a nontoxic pharmaceutical carrier they are adapted to be employed for human or veterinary medication in the form of the salt or as the free base depending upon the type of dosage form desired whether oral, parenteral or topical. The oral dosage forms may include liquids such as syrups, solutions, suspensions or dispersions, tablets, capsules, dispersible powders or granules, ampules for parenteral use, or salves and ointments in water-miscible or water-immiscible base vehicles as well known in the art.

While the novel compounds of our invention are useful alone, they may be formulated into compositions containing other therapeutic agents to add to or to enhance their therapeutic activity. When employed for their cardiovascular activity they may usefully be combined with sedatives such as phenobarbital or butabarbital.

The hydrochloric acid salt of 4-diethylaminoethyl-3-phenyl-5-imino-1,2,4-oxadiazole, for example, is highly effective as a coronary vasodilator and is employed for the control of the anginal syndrome in dosage units such as tablets which contain about 10 mg. per unit, the usual dose being from three to six tablets daily.

Other compounds of our invention are even more active as measured by coronary vasodilatation effect in accordance with the technique described by Langendorff, Arch. Ges. Physiol., vol. 61, page 291 (1895). For example, it has been observed that the hydrochloric acid salt of 3-phenyl-5-(dibutylaminoethylamino)-1,2,4-oxadiazole produces a tenfold effect as compared to that observed in the case of the hydrochloride of 3-phenyl-5-(diethylaminoethylamino)-1,2,4-oxadiazole.

As local anesthetics, the compounds of this invention are also quite effective as measured both by the rabbit cornea irritation method of Regnier, Diss. Paris (1929) and the conduction anesthesia test of Moukhtar, Compt. Rend. Soc. Biol. (Paris) 66, 1879 (1909) with some of the compounds of this invention exhibiting as much as two to four times the effectiveness of procaine.

The following examples are included in order further to illustrate the invention.

EXAMPLE 1

*3-phenyl-5-(diethylaminoethylamino)-1,2,4-oxadiazole*

128 grams of 3-phenyl-5-amino-1,2,4-oxadiazole and 32.5 grams of sodamide in about 1000 ml. of dry benzene are gradually heated to reflux for about five hours in a suitable reaction vessel provided with a reflux condenser. The reaction mixture is then cooled to about 65°–70° C. and a cold solution of 112 grams of diethylaminoethyl chloride in about 160 ml. of benzene then added. The reaction mixture thus formed is gradually heated to reflux and maintained under reflux for about three hours. After cooling the mixture is allowed to stand for about twelve hours, the by-product sodium chloride formed is removed and washed several times with dry benzene. After the benzene wash fractions are combined with the reaction mixture, the benzene is distilled off under vacuum. The 3-phenyl-5-(diethylaminoethylamino)-1,2,4-oxadiazole remaining is then obtained as the free base by fractional distillation, the base compound boiling at 165° C., under 0.2 mm. pressure, about 215 grams being obtained.

To convert the base to the hydrochloride salt, the 215 grams of the free base are dissolved with warming in about 600 ml. of isopropanol and the theoretical amount of a 25% solution of HCl in isopropanol required to neutralize the base is added. The salt is allowed to crystallize out by maintaining the isopropanol solution in a refrigerator for twenty four hours. The liquid is decanted or centrifuged off while cold and the crystalline salt washed with cold isopropanol. The crystalline salt is dissolved without drying in about 550 ml. of isopropanol to which a small amount, say about 2 cc. of water is added. Solution is obtained by heating and the hot solution filtered through carbon black. The filtrate is refrigerated for twenty four hours and the crystalline hydrochloride of 3-phenyl-5-(diethylaminoethylamino)-1,2,4-oxadiazole obtained is filtered off and dried. About 150 to 160 grams of the hydrochloride salt is obtained which melts at 158–160° C. using a Macquenne block.

EXAMPLE 2

*3-phenyl-5-(diethylaminoethylamino)-1,2,4-oxadiazole*

160 grams of 3-phenyl-5-amino-1,2,4-oxadiazole are dissolved in 1000 cc. of xylene, 56 grams of KOH are added and the reaction mixture obtained heated to boiling under reflux for three hours. A solution of 135 grams of diethylaminoethyl chloride in 250 cc. of xylene is added and heating under reflux is continued for eight hours after this addition. The by-product potassium chloride formed is filtered off and the xylene removed by distillation under vacuum. The yellowish oily residue consisting of 3-phenyl-5-(diethylaminoethylamino)-1,2,4-oxadiazole is purified by fractional distillation and is found to boil at 165° C. at 0.2 mm. pressure. The hydrochloride salt is obtained in accordance with the procedure described in Example 1.

EXAMPLE 3

*3-phenyl-5-(dimethylaminoethylamino)-1,2,4-oxadiazole*

By following the procedure described in either Example 1 or Example 2 but employing dimethylaminoethyl chloride in the reaction there is obtained 3-phenyl-5-(dimethylaminoethylamino)-1,2,4-oxadiazole which as the free base is an oil which boils at 130° C. under 0.1 mm. pressure. The free base may be converted to the hydrochloride salt in accordance with the procedure described. The hydrochloride salt of 3-phenyl-5-(dimethylaminoethylamino)-1,2,4-oxadiazole obtained is found to have a melting point of 189°–190° C.

EXAMPLE 4

*3-phenyl-5-(dimethylaminopropylamino)-1,2,4-oxadiazole*

Equimolar quantities of 3-phenyl-5-amino-1,2,4-oxadiazole (M.W. 161) and potassium hydroxide (M.W. 56) are added to 1000 cc. of xylene and the mixture obtained heated to boiling and one mol (M.W. 141) of dimethylaminopropyl chloride in xylene is then added and heating under reflux continued for 8 hours. The by-product KCl is filtered off and the xylene distilled off under vacuum. The oily residue which is the free base of 3-phenyl-5-(dimethylaminopropylamino)-1,2,4-oxadiazole is then fractionally distilled under vacuum and the purified product is found to have a boiling point of 165° C. at 0.1 mm. pressure.

To a concentrated solution obtained by dissolving 11.8 grams of succinic acid in 170 ml. of anhydrous ethanol is added a solution of 24.6 grams of the above base in 100 ml. of anhydrous ethanol. On adding about 200 ml. of anhydrous ethyl ether a thick precipitate is obtained which crystallizes only slowly but which can be readily recrystallized from isopropanol. The white, crystalline disuccinate salt of 3-phenyl-5-(dimethylaminopropylamino)-1,2,4-oxadiazole obtained is found to have a melting point of 112°–114° C. A yield of about 33 grams of the salt is obtained by this procedure.

The hydrochloride salt prepared as described above is found to have a melting point of 151° C.

EXAMPLE 5

*3-phenyl-5-(dimethylaminopropylamino)-1,2,4-oxadiazole*

Similarly, the 3-phenyl-5-(dimethylaminopropylamino)-1,2,4-oxadiazole obtained as described in Example 4 above is also obtained by reacting 16 grams of 3-phenyl-5-imino-1,2,4-oxadiazole and 4 grams of sodamide in 200 ml. of anhydrous toluene for two hours under reflux and, after cooling, then gradually adding a solution of 12.2 grams of dimethylaminopropyl chloride in 20 ml. of anhydrous toluene to the initial reaction mixture. The entire mixture is then heated under reflux for five hours with stirring. After cooling overnight, or for about 12 hours, the unreacted sodamide remaining is destroyed by adding water slowly with agitation after which an additional 100 ml. of water are added. The aqueous layer which separates on standing is decanted and after being extracted with 100 ml. of toluene, the toluene employed is added to the toluene solution containing the reaction product and then all of the toluene removed by distillation under vacuum. The purified free base obtained has a boiling point of 165° C. at 0.1 mm. pressure. When the free base is converted to the hydrochloride the 3-phenyl-5-(dimethylaminopropylamino)-1,2,4-oxadiazole hydrochloride obtained is found to have a melting point of 151° C.

EXAMPLE 6

*3-phenyl-5-(diethylaminopropylamino)-1,2,4-oxadiazole*

Following the procedure described in Example 1 employing 3-phenyl-5-amino-1,2,4-oxadiazole and sodamide and then reacting the resulting intermediate with 4-diethylaminopropyl chloride, there is obtained, as the free base, 3 - phenyl-5-(diethylaminopropylamino)-1,2,4-oxadiazole which is found to have a boiling point of 180° C. at 0.1 mm. pressure.

EXAMPLE 7

*3-phenyl-5-(dimethylaminoisopropylamino)-1,2,4-oxadiazole*

Following the procedure described in Example 1 and employing dimethylaminoisopropyl chloride

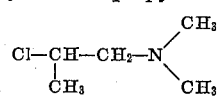

to react with the intermediate obtained after the sodamide reaction, there is obtained the free base 3-phenyl-5-(dimethylaminoisopropylamino) - 1,2,4-oxadiazole which is an oil having a boiling point of 195° C. at 0.1 mm. pressure. The picrate salt of this base may be obtained as described above and is found to have a melting point of 186° C.

EXAMPLE 8

*3-phenyl-5-(N-methylpiperazinopropylamino)-1,2,4-oxadiazole*

By reacting N-methylpiperazinopropyl chloride under reflux for about 30 hours with the product obtained on reacting 3-phenyl-5-amino-1,2,4-oxadiazole with sodamide in xylene, one obtains 3-phenyl-5-(N-methylpiperazinopropylamino)-1,2,4-oxadiazole which as the hydrochloride salt is found to have a melting point of 213°–215° C.

EXAMPLE 9

*3-phenyl-5-(dibutylaminoethylamino)-1,2,4-oxadiazole*

32 grams of 3-phenyl-5-amino-1,2,4-oxadiazole dissolved in about 150 ml. of anhydrous benzene, 7.8 grams of sodium amide are added and the reaction mixture heated at the boiling point with stirring for two hours. A solution of 38.3 grams of dibutylaminoethyl chloride in benzene is then added and the mixture heated to boiling under reflux for four hours. The sodium chloride is separated as previously described, the benzene removed by vacuum distillation and 56 grams of 3-phenyl-5-(dibutylaminoethylamino)-1,2,4-oxadiazole is obtained in the form of an oil which is then converted directly to the crystalline hydrochloride. This is accomplished by dissolving the oil in ethanol and adding the stoichiometric equivalent of anhydrous ethyl ether saturated with gaseous hydrogen chloride. The recrystallized salt is found to have a melting point of 145° C.

EXAMPLE 10

*3-phenyl-5-(diisoamylaminoethylamino)-1,2,4-oxadiazole*

20.4 grams of 3-phenyl-5-amino-1,2,4-oxadiazole are dissolved with heating in 100 ml. of anhydrous toluene and 5.1 grams of sodamide added. The mixture is heated under reflux for two hours while being strongly agitated, the formation of ammonia indicating the progress of the reaction. The reaction mixture is then cooled and 28 grams of diisoamylaminoethyl chloride in 50 ml. of toluene are added after which it is heated under reflux for four hours. The sodium chloride formed is filtered off and the solvent from the toluene solution containing the desired product is removed by vacuum distillation. The desired product 3-phenyl - 5 - diisoamylaminoethylamino-1,2,4-oxadiazole is obtained as an oil, a yield of about 21 grams being obtained. The oil is diluted with a small amount of ethanol, the solution decolorized with animal charcoal, an equal volume of anhydrous ethyl ether added and a solution of ethyl ether saturated with hydrogen chloride gas added gradually a little at a time. A gummy precipitate is obtained with complete precipitation at pH 1–2. This precipitate crystallizes on being refrigerated overnight. The supernatant ether is decanted and the crystalline product recrystallized from isoamyl alcohol avoiding the use of excess solvent and prolonged heating. The crystalline hydrochloride of 3-phenyl-5-diisoamylaminoethylamino-1,2, 4-oxadiazole has a melting point of 147° C.

EXAMPLE 11

*3-phenyl-5-(diisopropylaminoethylamino)-1,2,4-oxadiazole*

Following the method described in Example 10 but employing diisopropylaminoethyl chloride as the intermediate, one obtains 3-phenyl-5-(diisopropylaminoethylamino)-1,2,4-oxadiazole which as the hydrochloride salt has a melting point of 165° C.

EXAMPLE 12

*3-phenyl-5-(diallylaminoethylamino)-1,2,4-oxadiazole*

On reacting 53.6 grams of 3-phenyl-5-amino-1,2,4-oxadiazole with 13 grams of sodamide in anhydrous toluene and then with 52.16 grams of diallylaminoethyl chloride in the manner described in Example 10 there is obtained 43 grams of 3-phenyl-5-(diallylaminoethylamino)-1,2,4-oxadiazole in the form of an oil. This oil is converted to the hydrochloride salt in the manner described and this salt has a melting point of 126° C.

EXAMPLE 13

*3-phenyl-5-(di-n-hexylaminoethylamino)-1,2,4-oxadiazole*

After reacting 32 grams of 3-phenyl-5-amino-1,2,4-oxadiazole with 8 grams of sodamide in 100 ml. of anhydrous toluene for two hours there is then added to the cooled reaction mixture 48.5 grams of di-n-hexylaminoethyl chloride in 100 ml. of anhydrous toluene and the mixture heated under reflux for four hours. After cooling, 45 grams of the free base is obtained as an oil after being separated from the toluene and this base is then converted to its hydrochloride salt by adding a solution of gaseous hydrogen chloride in anhydrous ether to an ethanol solution of the base. The purified crystalline hydrochloride salt has a melting point of 138° C.

EXAMPLE 14

*3-phenyl-5-(diisobutylaminoethylamino)-1,2,4-oxadiazole*

To 29 grams of 3-phenyl-5-amino-1,2,4-oxadiazole in anhydrous toluene are added 7.02 grams of sodamide and after heating for two hours at the boiling point the reaction mixture is cooled and 35 grams of diisobutylaminoethyl chloride in 100 ml. of anhydrous toluene are added after which the mixture is heated to reflux for 4 hours. After removal of the toluene solvent, as described, 40 grams of the free base of 3-phenyl-5-(diisobutylaminoethylamino)-1,2,4-oxadiazole is obtained as an oil which is then converted to a crystalline hydrochloride salt as described in Example 13, this hydrochloride salt melting at 120° C.

EXAMPLE 15

*3-phenyl-5-(di-n-amylaminoethylamino)-1,2,4-oxadiazole*

32 grams of 3-phenyl-5-amino-1,2,4-oxadiazole is reacted with 8 grams of sodamide in 100 ml. of anhydrous toluene by heating for two hours with strong agitation and after cooling 43.9 grams of di-n-amylaminoethyl chloride in 100 ml. of anhydrous toluene are added and the mixture then heated for four hours under reflux. The toluene solvent is removed by vacuum distillation, after filtering off the sodium chloride, and 41 grams of the free base of 3 - phenyl - 5-(di-n-amylaminoethylamino)-1,2,4-oxadiazole are obtained as an oil which when converted to the crystalline hydrochloride salt and recrystallized from isopropyl alcohol is found to have a melting point of 130° C.

EXAMPLE 16

*3-p-methoxyphenyl-5-(diethylaminoethylamino)-1,2,4-oxadiazole*

38 grams of 3-p-methoxyphenyl-5-amino-1,2,4-oxadiazole are reacted with 9 grams of sodamide in 100 ml. of anhydrous toluene and after cooling 27 grams of diethylaminoethyl chloride in 100 ml. of toluene are added and the reaction mixture refluxed for 5 hours. The sodium chloride precipitate formed is filtered off, the toluene distilled off under vacuum and the oily residue of the free base of 3-p-methoxyphenyl-5-(diethylaminoethylamino)-1,2,4-oxadiazole is separated and converted to the hydrochloride melting at 170° C.

EXAMPLE 17

*3-orthochlorophenyl-5-(diethylaminoethylamino)-1,2,4-oxadiazole*

13 grams of 3-orthochlorophenyl-5-amino-1,2,4-oxadiazole are reacted with 3 grams of sodamide in 100 ml. of anhydrous toluene and after cooling 9 grams of diethylaminoethyl chloride in 100 ml. of toluene are added and the reaction mixture refluxed for 5 hours. The sodium chloride precipitate formed is filtered off, the toluene distilled off under vacuum and the oily residue of the free base of 3-orthochlorophenyl-5-(diethylaminoethylamino)-1,2,4-oxadiazole is separated and converted to the hydrochloride melting at 154° C.

EXAMPLE 18

*3-metafluorophenyl-5-(diethylaminoethylamino)-1,2,4-oxadiazole*

18 grams of 3-metafluorophenyl-5-amino-1,2,4-oxadiazole are reacted with 4.5 grams of sodamide in 100 ml. of anhydrous toluene and, after cooling, 15 grams of diethylaminoethyl chloride in 100 ml. of toluene are added and the reaction mixture refluxed for 5 hours. The sodium chloride precipitate formed is filtered off, the toluene distilled off under vacuum and the oily residue of the free base of 3-metafluorophenyl-5-(diethylaminoethylamino)-1,2,4-oxadiazole is separated. When converted to the hydrochloride, the latter melts at 158°–160° C.

EXAMPLE 19

*3-paratolyl-5-(diethylaminoethylamino)-1,2,4-oxadiazole*

44 grams of 3-paratolyl-5-amino-1,2,4-oxadiazole are reacted with 11.5 grams of sodamide in 100 ml. of anhydrous toluene and, after cooling, 39 grams of diethylaminoethyl chloride in 100 ml. of toluene are added and the reaction mixture refluxed for 5 hours. The sodium chloride prepicitate formed is filtered off, the toluene distilled off under vacuum and the oily residue of the free base of 3 - paratolyl - 5-(diethylaminoethylamino)-1,2,4-oxadiazole is separated. When converted to the hydrochloride the latter melts at 178°–180° C.

EXAMPLE 20

*3-parafluorophenyl-5-(diethylaminoethylamino)-1,2,4-oxadiazole*

18 grams of 3-parafluorophenyl-5-amino-1,2,4-oxadiazole are reacted with 4.5 grams of sodamide in 100 ml. of anhydrous toluene and, after cooling, 15 grams of diethylaminoethyl chloride in 100 ml. of toluene are added and the reaction mixture refluxed for 5 hours. The sodium chloride precipitate formed is filtered off, the toluene distilled off under vacuum and the oily residue of the free base of 3-parafluorophenyl-5-(diethylaminoethylamino)-1,2,4-oxadiazole is separated. When converted to the hydrochloride the latter melts at 163°–165° C.

EXAMPLE 21

*3-phenyl-5-(1'-piperidyl)ethylamino-1,2,4-oxadiazole*

40.5 grams of 3-phenyl-5-amino-1,2,4-oxadiazole are reacted with 11 grams of sodamide in 800 ml. of anhydrous toluene by refluxing for 5 hours. After cooling, 42.5 grams of N-(2-chloroethyl)-piperidine is added and the reaction mixture then heating under reflux is continued for three hours. The mixture is allowed to cool overnight, the toluene taken off under vacuum and the 3-phenyl-5-(1'-piperidyl)ethylamino-1,2,4-oxadiazole distilled over as an oil at 210° C. under 0.1 mm. pressure. When converted to the hydrochloride salt, the latter melts at 214° C. and resolidifies to melt again at 225° C.

The intermediate compound I above is believed to exist in solution in tautomeric form and in equilibrium with compound II, as follows:

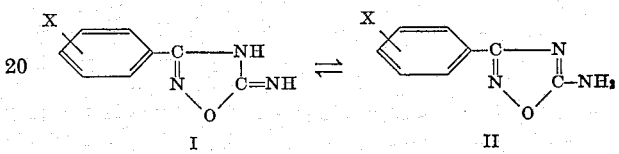

Accordingly, it is believed that the substituted 1,2,4-oxadiazoles of this invention may also exist in the following chemical structural form:

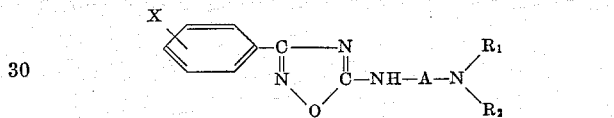

While for the sake of convenience but one structure has been employed above and in the claims in describing the novel compounds of this invention it is to be understood that both forms of the compounds and in either form are encompassed by this disclosure and the accompanying claims.

It is understood that the foregoing detailed description is given merely by way of illustration and that many variations may be made therein without departing from the spirit of our invention.

Having described our invention, what we desire to secure by Letters Patent is:

1. A compound of the group consisting of:
    (a) bases of the formula

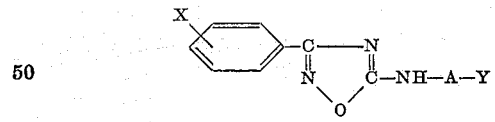

wherein:
   (1) X is selected from the group consisting of hydrogen, hydroxy, halogen, lower alkyl and lower alkoxy;
   (2) A is an alkylene group of the formula

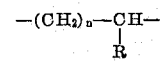

wherein:
   $n$ is 0 to 3 and R is selected from the group consisting of hydrogen and lower alkyl;
   (3) and Y is a monovalent radical containing a nitrogen atom bound to group A and selected from the group consisting of the N-methylpiperazino radical, the 1'-piperidyl radical and the radical:

wherein:
   $R_1$ and $R_2$ are each selected from the group consisting of straight and branched chain lower alkyl groups having one to six carbon atoms;
(b) and the non-toxic acid addition salts of said bases.

2. A compound according to claim 1, wherein said Y is the radical

and $R_1$ and $R_2$ are each selected from the group consisting of straight and branched chain lower alkyl groups having one to six carbon atoms.

3. A compound according to claim 1, wherein said Y is the radical

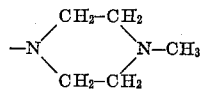

4. A compound according to claim 1, wherein said Y is the radical

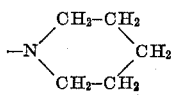

5. 3 - phenyl-5-(N-methylpiperazinopropylamino)-1,2,4-oxadiazole hydrochloride.

6. 3 - phenyl - 5 - (1'-piperidyl)ethylamino-1,2,4-oxadiazole hydrochloride.

7. 3 - phenyl - 5 - (diethylaminoethylamino)-1,2,4-oxadiazole hydrochloride.

8. 3 - phenyl - (dibutylaminoethylamino) - 1,2,4-oxadiazole hydrochloride.

9. 3 - phenyl - 5 - (N-methylpiperazinopropylamino)-1,2,4-oxadiazole.

10. 3 - phenyl - 5-(1'-piperidyl)ethylamino-1,2,4-oxadiazole.

11. 3 - phenyl - 5-(diethylaminoethylamino)-1,2,4-oxadiazole.

12. 3 - phenyl - 5-(dibutylaminoethylamino)-1,2,4-oxadiazole.

References Cited

UNITED STATES PATENTS

| | | | |
|---|---|---|---|
| 2,403,723 | 7/1946 | Kaiser | 260—307 |
| 3,040,050 | 6/1962 | Biel | 260—296 |
| 3,141,019 | 7/1964 | Palazzo et al. | 260—268 |
| 3,203,959 | 8/1965 | Huffman | 260—307 |
| 3,245,989 | 4/1966 | Palazzo et al. | 260—268 |

OTHER REFERENCES

Hickinbottom: Reactions of Organic Compounds (1948), pp. 299–300.

Sterne et al.: Chemical Abstracts, vol. 62, p. 15308, 1965.

ALEX MAZEL, *Primary Examiner.*

HENRY R. JILES, *Examiner.*

JAMES W. ADAMS, *Assistant Examiner.*